United States Patent Office 3,304,140
Patented Feb. 14, 1967

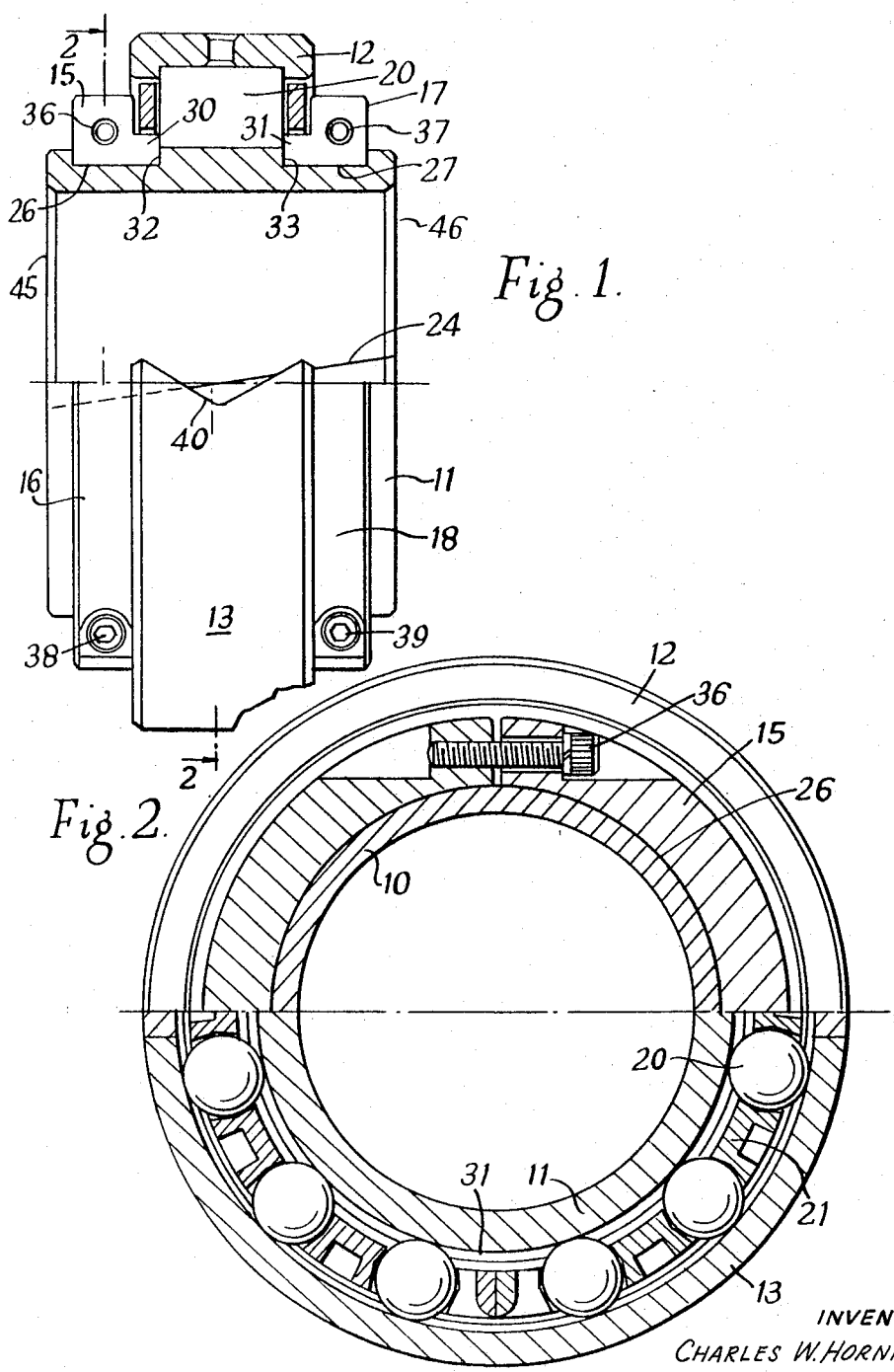

3,304,140
ROLLER BEARINGS
Charles W. Hornigold, King's Lynn, Norfolk, England, assignor to Cooper Roller Bearings Company Limited, Norfolk, England, a British company
Filed Dec. 2, 1964, Ser. No. 415,272
Claims priority, application Great Britain, Dec. 4, 1963, 47,908/63
4 Claims. (Cl. 308—236)

This invention relates to split roller bearings having an inner race which is split to form two semi-circular parts to facilitate assembly on a shaft, an outer race which is similarly split, and a cage located between these races and holding the rollers in spaced relationship circumferentially of the races.

It is usual to provide a shaft at opposite ends thereof with two types of such bearings viz. locating type and non-locating type, the former holding the shaft against axial movement while the latter permits a certain axial float to accommodate expansion and contraction of the shaft due for example to variation of temperature or shaft deflection. It is known to provide the locating type of bearing with clamping rings for clamping the split inner race on the shaft but various difficulties are experienced with known designs. Difficulty is experienced in locating the race halves axially in relation to each other. Still further difficulties arise in production in relation to ease of machining, grinding and hardening.

The object of the invention is to provide improved bearings of the locating kind.

According to the invention described in the prior Patent No. 3,166,363 the roller bearing comprises an inner race split into two approximately semi-circular parts, an outer race split into two approximately semi-circular parts, rollers located radially between the races, a cage for locating the rollers in spaced relationship circumferentially of the races, and annular clamping rings similarly split into ring parts and located on each side of the inner race, said inner race having an axial length which is larger than the axial length between the outer faces of the clamping means, screw means for clamping the ring parts together tightly on the inner race, said ring parts being positively located in both directions axially on the inner race, at least one integral abutment part or lip on each ring part extending through adjacent cage parts into contact with the rollers, said ring sbeing composed of hardenable steel, said lips being hardened at least where they contact the rollers, and inwardly directed abutment surfaces integrally formed on the outer race parts for axial location against the rollers.

The axial location may be accomplished by providing annular grooves in the outer surface of the inner race spaced from the ends of the race and engaged by annular ribs or projections on the clamping means.

According to the present invention the annular grooves in the inner surface of the inner race receive the inner peripheral margins of the clamping rings and the clamping rings have their largest axial width at their internal peripheries and extend inwardly (towards the rollers) to the same extent as the roller-engaging abutment parts.

Thus the clamping rings are of approximately L-shaped section with the inner roller-contacting surfaces contiguous with the groove-engaging inner surfaces of the rings.

This provides a very rigid structure and avoids machining of separate ribs.

A constructional form of the invention will now be described by way of example with reference to the accompanying drawing wherein:

FIGURE 1 is a view of a bearing made in accordance with the invention, the lower part being in elevation and the upper part being a radial section; and FIGURE 2 is a sectional view on the line 2—2 on FIGURE 1.

The bearing comprises split semi-circular inner race parts 10, 11; split semi-circular outer race parts 12, 13; and split semi-circular ring parts 15, 16 and 17, 18 constituting clamping means for clamping the inner race parts 10, 11 together. Rollers 20 are located between the inner and outer races and are held in spaced relationship circumferentially of the races by a cage 21. The lines of split 24 of the inner race are at an angle to the axis of the bearing. Grooves 26, 27 are machined and ground in the exterior surface of the inner race and receive the largest axial width of the ring parts, this largest width being at and adjacent the inner peripheries of the ring parts. The ring parts have integral inwardly extending abutment parts or lips 30, 31 which engage the rollers and locate the rollers axially. The inner peripheries of the ring parts at 32, 33 extend inwardly (towards the rollers) to the same extent as the roller-engaging lips 30, 31.

Thus the clamping rings are of approximately L-shaped section with the inner roller contacting surfaces or lips 30, 31 contiguous with the groove-engaging inner surfaces of the rings.

The outer race is machined with a roller locating groove 34.

The halves of the inner race are fixed together by screws 36, 37, 38, 39 which have shanks that pass through the first half of the clamping ring with clearance and screw into the other half.

The lines of split 40 of the outer race are of "bird mouth" form.

The clamping rings are made of a surface hardening steel and the lips 30, 31 are flame hardened or case hardened.

The inner race has a constant outer diameter except for the grooves.

The bearing is contained in a housing (not shown) and as in our prior application the construction of the housing can be of exactly the same for a non-locating bearing of similar loading.

I claim:
1. A roller bearing comprising an inner race split into two approximately semi-circular parts, an outer race split into two approximately semi-circular parts, rollers located radially between the races, a cage for locating the rollers in spaced relationship circumferentially of the races, and annular clamping rings similarly split into ring parts and located on each side of the inner race, screw means for clamping the ring parts together tightly on the inner race, abutment parts of the ring parts, extending through the cage into contact with the rollers, annular grooves in the outer surface of the inner race receiving the inner peripheral margins of the clamping rings, the clamping rings having their largest axial width at their internal peripheries and extending inwardly (towards the rollers) to the same extent as the roller-engaging abutment parts.

2. A roller bearing as claimed in claim 1 wherein the clamping rings are made of surface hardenable steel and are hardened at least where they contact the rollers.

3. A roller bearing as claimed in claim 1 or 2 wherein the inner race has a constant outer diameter except for said grooves.

4. A roller bearing substantially as described with reference to the accompanying drawings.

References Cited by the Examiner
UNITED STATES PATENTS 3,136,363  1/1965  Kay _____ 308—207

MARTIN P. SCHWADRON, *Primary Examiner.*
FRANK SUSKO, *Assistant Examiner.*